(12) United States Patent
Zhu

(10) Patent No.: US 11,966,257 B2
(45) Date of Patent: Apr. 23, 2024

(54) FLEXIBLE DISPLAY PANEL AND FLEXIBLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Cuilin Zhu, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 591 days.

(21) Appl. No.: 17/262,680

(22) PCT Filed: Oct. 21, 2020

(86) PCT No.: PCT/CN2020/122410
§ 371 (c)(1),
(2) Date: Jan. 22, 2021

(87) PCT Pub. No.: WO2022/036834
PCT Pub. Date: Feb. 24, 2022

(65) Prior Publication Data
US 2022/0398948 A1    Dec. 15, 2022

(30) Foreign Application Priority Data
Aug. 17, 2020 (CN) .......................... 202010825478.3

(51) Int. Cl.
*G06F 1/16* (2006.01)
*G09F 9/30* (2006.01)

(52) U.S. Cl.
CPC ............ *G06F 1/1652* (2013.01); *G09F 9/301* (2013.01)

(58) Field of Classification Search
CPC ............................... G06F 1/1656; G09F 9/301
See application file for complete search history.

(56) References Cited

U.S. PATENT DOCUMENTS

| | | | |
|---|---|---|---|
| 9,342,105 B2* | 5/2016 | Choi | ........................ G06F 1/182 |
| 9,733,674 B2 | 8/2017 | Lee | |
| 10,191,517 B2 | 1/2019 | Kang | |

FOREIGN PATENT DOCUMENTS

| | | |
|---|---|---|
| CN | 108615460 A | 10/2018 |
| CN | 108766247 A | 11/2018 |
| CN | 108831300 A | 11/2018 |

(Continued)

OTHER PUBLICATIONS

English translation of CN 111338497 A (Year: 2020).*
(Continued)

*Primary Examiner* — Mukundbhai G Patel
(74) *Attorney, Agent, or Firm* — PV IP PC; Wei Te Chung; Zhigang Ma

(57) ABSTRACT

In a flexible display panel and a flexible display device provided by the present application, a bending end of a support layer is configured inwardly to be shorter than a flexible display module to reduce a bending angle of the support layer. In this way, bending stress on the support layer can be reduced, thereby increasing attachment quality of the support layer and improving attachment reliability.

20 Claims, 3 Drawing Sheets

(56) References Cited

FOREIGN PATENT DOCUMENTS

| CN | 109494315 A | | 3/2019 | |
|----|-------------|---|--------|---|
| CN | 109817684 A | | 5/2019 | |
| CN | 110649058 A | | 1/2020 | |
| CN | 111029393 A | | 4/2020 | |
| CN | 111063256 A | | 4/2020 | |
| CN | 210489620 U | | 5/2020 | |
| CN | 111338497 A | * | 6/2020 | ........... G06F 3/0416 |
| CN | 111416056 A | | 7/2020 | |

OTHER PUBLICATIONS

International Search Report in International application No. PCT/CN2020/122410, dated May 20, 2021.
Written Opinion of the International Searching Authority in International application No. PCT/CN2020/122410, dated May 20, 2021.
Chinese Office Action issued in corresponding Chinese Patent Application No. 202010825478.3 dated May 7, 2021, pp. 1-8.

* cited by examiner

FLEXIBLE DISPLAY PANEL AND FLEXIBLE DISPLAY DEVICE

RELATED APPLICATIONS

This application is a Notional Phase of PCT Patent Application No. PCT/CN2020/122410 having international filing date of Oct. 21, 2020, which claims the benefit of priority of Chinese Patent Application No. 202010825478.3 filed on Aug. 17, 2020. The contents of the above applications are all incorporated by reference as if fully set forth herein in their entirety. FIELD OF INVENTION The present application is related to the field of display technology, and specifically, to a flexible display panel and a flexible display device.

BACKGROUND OF INVENTION

In a modern communication industry, market demands for products such as mobile phones, televisions, tablet computers, laptop computers, and digital cameras are increasing. Various display devices are developing towards full screen displays. In flexible full screen display modules, side display design is becoming a next-generation trend.

A bending angle of a U-shaped attaching product in the side display design is too large, and a super clean foam (SCF) material cannot withstand large angle bending, resulting in a shape of the SCF being broken or inveraciously attached, which reduces product quality and cannot satisfy reliability requirements.

SUMMARY OF INVENTION

The present application provides a flexible display panel, which solves a problem of poor attachment reliability of a support layer in a U-shaped attaching product.

In a first aspect, the present application provides a flexible display, including a flexible display module attached on an inner surface of a U-shaped cover plate. The flexible display module includes a main display surface and a side display surface extending from the main display surface. A support layer is attached on a side of the flexible display module away from the U-shaped cover plate. A bending end of the support layer is configured inwardly to be shorter than the flexible display module to reduce a bending angle of the support layer.

Based on the first aspect, in a first embodiment of the first aspect, an angle between a tangent ray starting from an end point of the support layer and a ray starting from the end point and parallel to an extension direction of the main display surface is less than or equal to a right angle.

Based on the first embodiment of the first aspect, in a second embodiment of the first aspect, the support layer includes a sloped end surface.

Based on the second embodiment of the first aspect, in a third embodiment of the first aspect, an angle between an extension direction of the end surface and the extension direction of the main display surface is an acute angle.

Based on the first aspect, in a fourth embodiment of the first aspect, material of the support layer includes a foam material.

Based on the fourth embodiment of the first aspect, in a fifth embodiment of the first aspect, the material of the support layer further includes at least one of copper foil or graphite.

Based on the first aspect, in a sixth embodiment of the first aspect, the flexible display module further includes a base substrate, a self-luminous functional layer on a side of the base substrate, an optical adhesive layer, and the U-shaped cover plate, which are stacked.

Based on the sixth embodiment of the first aspect, in a seventh embodiment of the first aspect, the flexible display module further includes a polarizer disposed between the self-luminous functional layer and the optical adhesive layer.

Based on the sixth embodiment of the first aspect, in an eighth embodiment of the first aspect, the base substrate includes a thin-film transistor array layer disposed on the base substrate, and the thin-film transistor array layer is disposed between the base substrate and the self-luminous functional layer.

In a second aspect, the present application provides a flexible display device, including a main display surface, a side display surface extending from the main display surface, and a support layer attached on a side of the main display surface and the side display surface. The support layer is attached on a portion of the side display surface and does not exceed a position corresponding to an outer vertex of the side display surface. The position passes through an extension direction of the outer vertex and is parallel to an extension direction of the main display surface.

In the flexible display panel provided by the present application, the bending end of the support layer is configured inwardly to be shorter than the flexible display module to reduce the bending angle of the support layer. In this way, bending stress on the support layer can be reduced, thereby increasing attachment quality of the support layer and improving attachment reliability.

DETAILED DESCRIPTION OF PREFERRED EMBODIMENTS

In order to make purposes, technical solutions, and effects of the present application clearer and more specific, the present application is further described in detail below with reference to the accompanying drawings and examples. It should be understood that the specific embodiments described herein are only used to explain the application and are not used to limit the present application.

Figure 1:
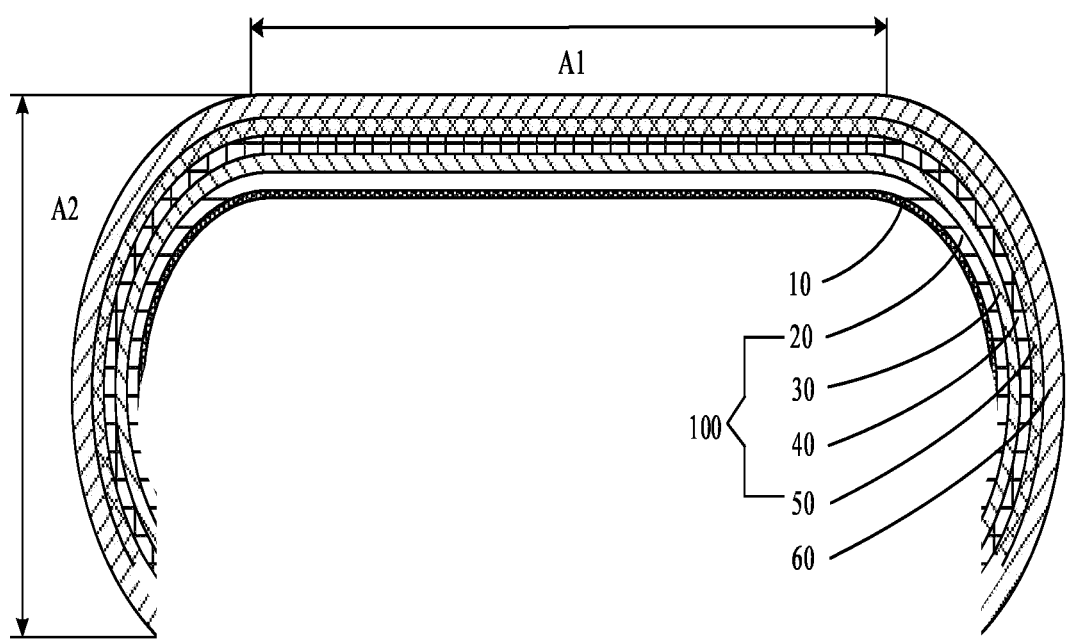
FIG. 1 is a schematic diagram of a first cross-sectional structure of a flexible display panel provided by an embodiment of the present application.

As shown in FIG. 1, an embodiment provides a flexible display panel, which includes a flexible display module 100 attached on an inner surface of a U-shaped cover plate 60. The flexible display module 100 includes a main display surface A1 and a side display surface A2 extending from the main display surface A1. A support layer 10 is attached on a side of the flexible display module 100 away from the U-shaped cover plate 60. A bending end of the support layer 10 is configured inwardly to be shorter than the flexible display module 100 to reduce a bending angle of the support layer 10.

Figure 2:
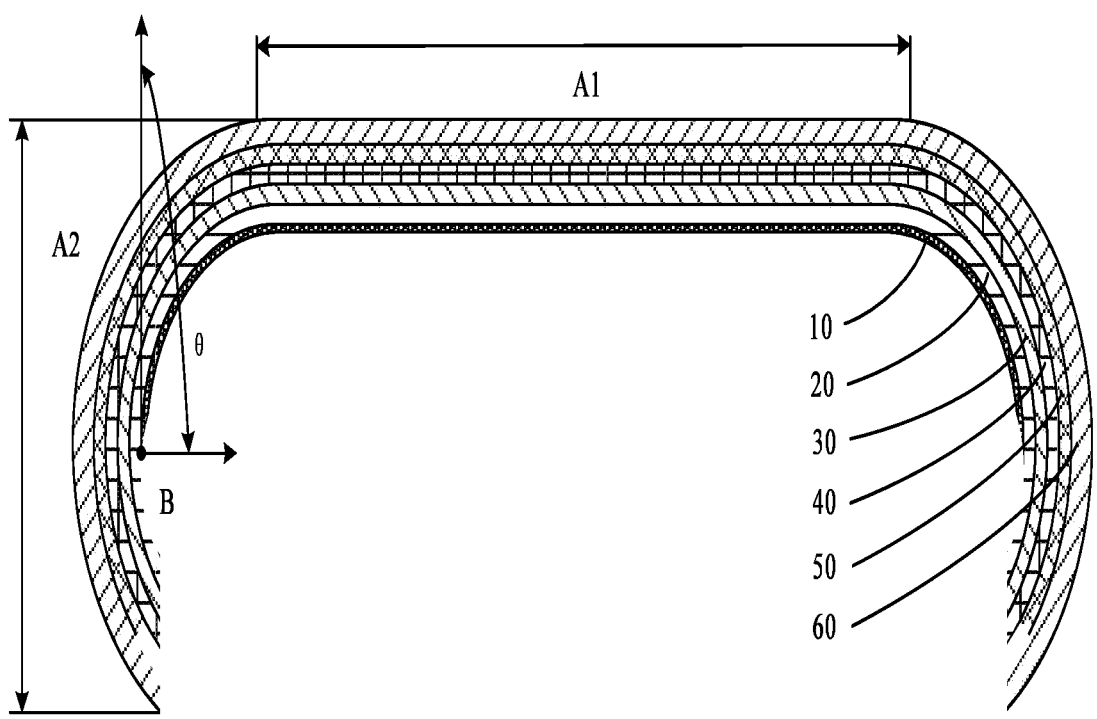
FIG. 2 is a schematic diagram of a second cross-sectional structure of the flexible display panel provided by an embodiment of the present application.

As shown in FIG. 2, in an embodiment, the support layer 10 is attached on a side of the main display surface A1 and the side display surface A2. An angle θ between a tangent ray starting from an end point B of the support layer 10 and a ray starting from the end point B and parallel to an extension direction of the main display surface A1 is less than or equal to a right angle.

Understandably, the main display surface A1 and the side display surface A2 in the present application are display regions with different angles, and the main display surface A1 and the side display surface A2 can be, but are not limited to, positioned on different planes.

It should be explained that the support layer 10 attached on the side of the main display surface A1 and the side display surface A2 is attached on an inner side of the main display surface A1 and the side display surface A2, and an outer side of the main display surface A1 and the side display surface A2 is configured to display images.

It should be explained that the end point B of the support layer 10 has the tangent ray starting therefrom. The end point B of the support layer 10 is a point on an end surface of the support layer 10, and the point has a tangent line, which means that the end point B is positioned on an outer surface of the support layer 10 and is an outermost point on the end surface of the support layer. The extension direction of the main display surface A1 is a direction from the main display surface A1 to the side display surface A2.

Therefore, in this embodiment, the angle θ between the tangent ray starting from the end point B of the support layer 10 and the ray starting from the end point B and parallel to the extension direction of the main display surface A1 is configured to be less than or equal to a right angle, so as to restrict the support layer 10 to not be bent into a large angle region and reduce bending stress on the support layer 10, thereby increasing attachment quality of the support layer 10 and improving attachment reliability.

In an embodiment, the support layer 10 includes a sloped end surface. It should be explained that the sloped end surface can increase an area of the end surface of the support layer 10 and can further disperse bending stress on the end surface of the support layer 10. In this way, bending damages to the support layer 10 can be reduced or prevented, while inveracious or weak attachment during attaching the support layer 10 can be reduced or prevented, so as to improve the reliability.

Understandably, the sloped end surface can be, but is not limited to, an inner sloped end surface, or it can be an outer sloped end surface.

In an embodiment, an angle θ between an extension direction of the end surface and the extension direction of the main display surface A1 is an acute angle. Understandably, this embodiment further defines that the sloped end surface is the inner sloped end surface. Compared with the outer sloped end surface, based on the above improvement of the reliability, the inner sloped end surface can better support, protect, and buffer a base substrate 20.

It should be explained that there is a wedge-shaped channel between an end portion of the support layer 10 and the base substrate 20 in the outer sloped end surface, and there is no gap between the end portion of the support layer 10 and the base substrate 20 in the inner sloped end surface.

In an embodiment, material of the support layer 10 includes, but is not limited to, at least one of copper foil or graphite, and can further include a foam material. It should be explained that the support can be, but is not limited to, a super clean support layer made of a super clean foam (SCF).

In an embodiment, the flexible display module 100 further includes the base substrate 20, a self-luminous functional layer 30 on a side of the base substrate 20, an optical adhesive layer 50, and a transparent cover plate 60, which are stacked.

Understandably, the transparent cover plate 60 can be, but is not limited to, a glass cover plate.

In an embodiment, the flexible display module 100 further includes a polarizer 40 disposed between the self-luminous functional layer 30 and the optical adhesive layer 50.

In an embodiment, the support layer 10 is disposed on the other side of the base substrate 20.

In an embodiment, the base substrate 20 includes a thin-film transistor array layer disposed on the base substrate 20. The thin-film transistor array layer is disposed between the base substrate 20 and the self-luminous functional layer 30.

Understandably, the above stacking structure of the flexible display module 100 is easy to understand, which is not described in detail herein. It should be explained that areas of the base substrate 20, the self-luminous functional layer 30, and the optical adhesive layer 50 are equal or similar, an area of the polarizer 40 is less than the areas of the base substrate 20, the self-luminous functional layer 30, and the optical adhesive layer 50, an area of the support layer 10 is less than the area of the polarizer 40, and an area of the transparent cover plate 60 is the greatest. Accordingly, the less the area is, the greater a size of each layer structure configured inwardly from the end portion is, and vice versa.

In an embodiment, the side display surface A2 can be, but is not limited to, a curved surface. The main display surface A1 can be, but is not limited to, a flat surface, or can be a curved surface.

Figure 3:
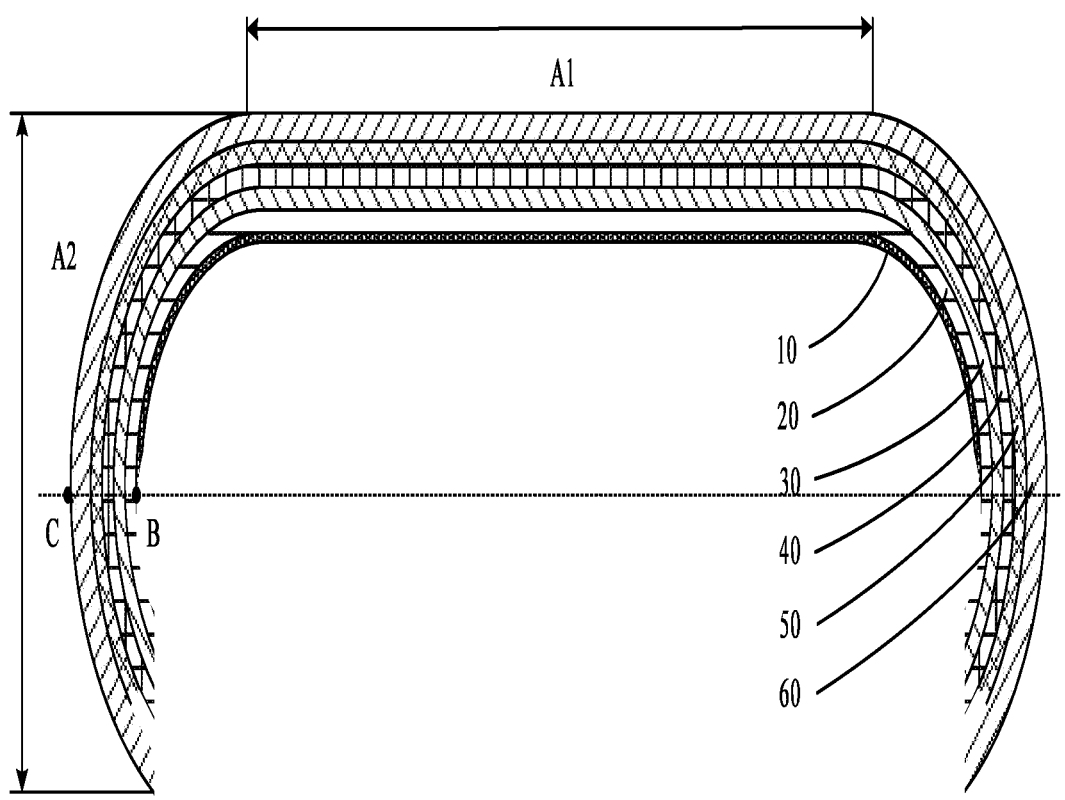
FIG. 3 is a schematic diagram of a cross-sectional structure of a flexible display device provided by an embodiment of the present application.

As shown in FIG. 3, in an embodiment, a flexible display device is provided. The flexible display device includes a main display surface A1, a side display surface A2 extending from the main display surface A1, and a support layer 10 attached on a side of the main display surface A1 and the side display surface A2. The support layer 10 is attached on a portion of the side display surface A2 and does not exceed a position corresponding to an outer vertex C of the side display surface A2. The position passes through an extension direction of the outer vertex C and is parallel to an extension direction of the main display surface A1.

It should be explained that the outer vertex C of the side display surface A2 is equivalent to a lowest point of an arc of a U-shaped product, or a center point of the arc, and the support layer 10 does not exceed this position. This can restrict the support layer 10 to not be bent into a large angle region and reduce bending stress on the support layer 10, thereby increasing attachment quality of the support layer 10 and improving attachment reliability.

In summary, the term "self-luminous" in the present application can be, but is not limited to, an organic light-emitting display or an organic light-emitting illumination, and the term "organic light-emitting" can be, but is not limited to, an organic light-emitting diode (OLED) type light-emitting.

The term "flexible" can be, but is not limited to, bendable, foldable, or rollable.

The side display surface A2 in the present application includes, but is not limited to, at least one side display surface A2. A plurality of side display surfaces A2 can be provided, such as two side display surfaces A2, three side display surfaces A2, four side display surfaces A2, or an integer number of side display surfaces A2.

Understandably, the flexible display panel and the flexible display device provided by the present application can achieve a same technical effect. Technical solutions of the two can also be used for mutual reference, and both of them can be, but are not limited to, applied to the following products or fields:
1. wearable devices such as smart bracelets, smart watches, virtual reality (VR) devices, and other devices
2. mobile phones
3. electronic books and electronic newspapers
4. televisions
5. personal portable computers
6. flexible OLED displays and illumination such as foldable and rollable OLED displays.

Understandably, those having ordinary skills of the art may easily contemplate various changes and modifications of the technical solution and technical ideas of the present invention and all these changes and modifications are considered within the protection scope of right for the present invention.

What is claimed is:

1. A flexible display panel, comprising a flexible display module attached on an inner surface of a U-shaped transparent cover plate;
wherein the flexible display module comprises a main display surface and a side display surface extending from the main display surface;
wherein a support layer is attached on a side of the flexible display module away from the U-shaped transparent cover plate; and
wherein a bending end of the support layer is configured inwardly to be shorter than the flexible display module to reduce a bending angle of the support layer, and the bending end of the support layer is at a position corresponding to an outer vertex of the side display surface, wherein a line through the bending end of the support layer and the outer vertex of the side display surface is parallel to an extension direction of the main display surface.

2. The flexible display panel according to claim 1, wherein an angle between a tangent ray starting from an end point of the support layer and a ray starting from the end point and parallel to an extension direction of the main display surface is less than or equal to a right angle.

3. The flexible display panel according to claim 2, wherein the support layer comprises a sloped end surface.

4. The flexible display panel according to claim 3, wherein an angle between an extension direction of the end surface and the extension direction of the main display surface is an acute angle.

5. The flexible display panel according to claim 1, wherein material of the support layer comprises a foam material.

6. The flexible display panel according to claim 5, wherein the material of the support layer further comprises at least one of copper foil or graphite.

7. The flexible display panel according to claim 1, wherein the flexible display module further comprises a base substrate, a self-luminous functional layer on a side of the base substrate, an optical adhesive layer, and the U-shaped transparent cover plate, which are stacked.

8. The flexible display panel according to claim 7, wherein the flexible display module further comprises a polarizer disposed between the self-luminous functional layer and the optical adhesive layer.

9. The flexible display panel according to claim 7, wherein the base substrate comprises a thin-film transistor array layer disposed on the base substrate, and the thin-film transistor array layer is disposed between the base substrate and the self-luminous functional layer.

10. A flexible display panel, comprising a flexible display module attached on an inner surface of a U-shaped cover plate;
wherein the flexible display module comprises a main display surface and a side display surface extending from the main display surface;
wherein a support layer is attached on a side of the flexible display module away from the U-shaped cover plate; and
wherein a bending end of the support layer is configured inwardly to be shorter than the flexible display module to reduce a bending angle of the support layer, and the bending end of the support layer is at a position corresponding to an outer vertex of the side display surface, wherein a line through the bending end of the support layer and the outer vertex of the side display surface is parallel to an extension direction of the main display surface.

11. The flexible display panel according to claim 10, wherein an angle between a tangent ray starting from an end point of the support layer and a ray starting from the end point and parallel to an extension direction of the main display surface is less than or equal to a right angle.

12. The flexible display panel according to claim 11, wherein the support layer comprises a sloped end surface.

13. The flexible display panel according to claim 12, wherein an angle between an extension direction of the end surface and the extension direction of the main display surface is an acute angle.

14. The flexible display panel according to claim 10, wherein material of the support layer comprises a foam material.

15. The flexible display panel according to claim 14, wherein the material of the support layer further comprises at least one of copper foil or graphite.

16. The flexible display panel according to claim 10, wherein the flexible display module further comprises a base substrate, a self-luminous functional layer on a side of the base substrate, an optical adhesive layer, and the U-shaped cover plate, which are stacked.

17. The flexible display panel according to claim 16, wherein the flexible display module further comprises a polarizer disposed between the self-luminous functional layer and the optical adhesive layer.

18. The flexible display panel according to claim 16, wherein the base substrate comprises a thin-film transistor array layer disposed on the base substrate, and the thin-film transistor array layer is disposed between the base substrate and the self-luminous functional layer.

19. A flexible display device, comprising a main display surface, a side display surface extending from the main display surface, and a support layer attached on a side of the main display surface and the side display surface;
wherein the support layer is attached on a portion of the side display surface and does not exceed a position corresponding to an outer vertex of the side display surface; and
, wherein a line through a bending end of the support layer and the outer vertex of the side display surface is parallel to an extension direction of the main display surface.

20. The flexible display device according to claim 19, wherein the side display surface is a curved surface.

* * * * *